(12) United States Patent
Appleton et al.

(10) Patent No.: US 6,775,872 B1
(45) Date of Patent: Aug. 17, 2004

(54) SURFACE-TRAVERSING VEHICLE

(75) Inventors: Ernest Appleton, Durham (GB); Neil William Stutchbury, East Boldon (GB)

(73) Assignee: University of Durham, Durham (GB)

( * ) Notice: Subject to any disclaimer, the term of this patent is extended or adjusted under 35 U.S.C. 154(b) by 0 days.

(21) Appl. No.: 09/600,712

(22) PCT Filed: Jan. 18, 1999

(86) PCT No.: PCT/GB99/00153
§ 371 (c)(1),
(2), (4) Date: Oct. 18, 2000

(87) PCT Pub. No.: WO99/36724
PCT Pub. Date: Jul. 22, 1999

(30) Foreign Application Priority Data

Jan. 17, 1998 (GB) .............................................. 9800905

(51) Int. Cl.[7] .......................... B08B 9/00; F16L 45/00; E21B 37/00
(52) U.S. Cl. .............................. 15/104.16; 15/104.17; 15/104.19; 15/104.2; 15/104.05; 166/170
(58) Field of Search .......................... 15/104.2, 104.16, 15/104.17, 104.18, 104.19, 104.05, 104.31; 324/220, 221; 104/138.1, 138.2; 166/170

(56) References Cited

U.S. PATENT DOCUMENTS

| | | | | |
|---|---|---|---|---|
| 1,608,347 A | * | 11/1926 | Thompson et al. | 15/104.17 |
| 2,552,339 A | * | 5/1951 | Moon | 15/104.061 |
| 2,932,837 A | * | 4/1960 | Ver Nooy | 15/104.18 |
| 3,310,113 A | * | 3/1967 | Maness | 166/173 |
| 3,525,111 A | * | 8/1970 | Von Arx | 15/104.061 |
| 3,946,459 A | | 3/1976 | Armstrong | |
| 4,447,777 A | * | 5/1984 | Sharp et al. | 324/220 |
| 5,018,451 A | * | 5/1991 | Hapstack | 104/138.2 |
| 5,121,694 A | | 6/1992 | Zollinger | |
| 5,625,917 A | | 5/1997 | Hawkins | |
| 6,431,079 B1 | * | 8/2002 | Appleton et al. | 104/138.2 |
| 6,460,616 B1 | * | 10/2002 | Simpson | 166/104 |

FOREIGN PATENT DOCUMENTS

| | | |
|---|---|---|
| FR | 2495191 | 12/1980 |
| GB | 2305407 A | 4/1997 |
| WO | WO 98/06927 | 2/1998 |

* cited by examiner

Primary Examiner—Robert J. Warden, Sr.
Assistant Examiner—Laura C Cole
(74) Attorney, Agent, or Firm—Daniel B. Schein, Ph.D. Esq.

(57) ABSTRACT

A vehicle for traversing a surface such as for carrying out an inspection, survey or maintenance operation upon that surface comprises two bodies interconnected by means to move the bodies towards and away from each other, each of those bodies being supported upon a multiplicity of resilient bristles (13; 25; 32) extending from it, the bristles of each body being mounted in groups upon bristle-carrying members (10; 23; 31) each guided for movement towards and away from the body, and fluid pressure means (25; 22; 34) to effect the guided movement of the bristle-carrying members in at least one of those directions.

27 Claims, 5 Drawing Sheets

SURFACE-TRAVERSING VEHICLE

BACKGROUND TO THE INVENTION

1. Field of the Invention

The present invention is a vehicle for traversing a surface such as for carrying out an inspection, survey or maintenance operation upon that surface.

2. Description of Related Art

In Patent Specification No. GB2305407A we have described a vehicle for this purpose which comprises two bodies interconnected by means to move the bodies towards and away from each other, each said body being supported upon a multiplicity of resilient bristles extending from it. Operation of that vehicle by alternate moving of the bodies towards and away from each other causes it to move in successive steps along a generally linear path over the surface upon which it is supported. The bristles are inclined by a small amount away from being perpendicular to the surface and thereby provide a grip upon that surface which is greater in one direction than in the opposite direction, as determined by the direction of inclination of the bristles.

This foregoing surface-traversing vehicle has proved to be able to move progressively and effectively over a range of different surfaces. When it is required to move in the opposite direction, for example to withdraw from a tubular conduit in which it has been operating, it is necessary for the surface-gripping effect of the bristles to be reversed by reversing the direction of inclination of the bristles. One possible way of achieving that reversal is to rely wholly upon the resiliency of the bristles and to reverse their direction of inclination simply by pulling axially upon the relevant bristle-supporting body. The reorientation of the bristles may be assisted by rotating the relevant body about its axis.

As indicated in the above patent specification, it could be advantageous if at least one of the bristle-supported bodies were constructed with retractable bristles. However the provision of a mechanically-operated system for retracting such bristles is particularly difficult in the case of surface-traversing vehicles of the present general type in that one important use of such vehicles is in the harsh environments of sewers, oil pipelines and the like, wherein deposited dirt and other sediments can readily impede continued satisfactory mechanical operations. It is perhaps not surprising that no satisfactory provision of such retractable bristles has hitherto been available.

It is therefore an object of the present invention to provide a surface-traversing vehicle of this general type in which a practical and advantageous retraction of the bristles is made possible.

BRIEF SUMMARY OF THE INVENTION

According to the present invention, there is provided a surface-traversing vehicle comprising a plurality of bodies at least one moving device for moving at least one pair of adjacent said bodies towards and away from each other, a plurality of bristle-carrying members mounted to a plurality of said bodies, a plurality of resilient bristles mounted to each said bristle-carrying member, wherein each said bristle-carrying member is adapted to be moved in a respective first direction away from the corresponding said body and a respective second direction towards the corresponding said body, and at least one fluid pressure device for moving said bristle carrying members in the respective first and/or second direction thereof relative to the corresponding said body, wherein said moving device is adapted to cause said vehicle to traverse a surface by moving at least one pair of adjacent said bodies towards and away from each other when a plurality of said bristles of said body are in engagement with said surface to support the vehicle.

Thus, by operation of the fluid pressure means associated with one of the bodies, the bristles of that body may be retracted and/or extended as required, to enable their orientation to be reversed and the body to be moved more readily in its reverse direction, thereby permitting reversal of the direction of movement of the surface-traversing vehicle.

As described in Specification No. GB2305407A, the interconnected bodies which are a feature of the surface-traversing vehicles of the type to which the present invention is applied may be of various shapes depending upon the general nature of the surface to be traversed. Thus they may be generally flat or, for example, rotationally symmetrical, for example generally cylindrical. The bristles may extend generally perpendicularly from the bodies if the bodies are flat. Most usually, the bodies will be generally cylindrical and the bristles will extend generally radially outwardly or inwardly of the body. While the surface-traversing vehicle may comprise generally hollow bodies with inwardly-directed bristles, designed to enable it to progress over the outer surface of a chimney, cable or like conduit, the vehicle is particularly well adapted to use within a tubular pipe, sewer or similar conduit and for that purpose will have outwardly-directed bristles, in particular bristles directed radially outwardly.

Although in most cases the bristles are preferably directed generally perpendicularly, including radially, from the bodies upon which they are mounted, in particular when the bodies are viewed from the side relative to their direction of relative movement, when those bodies are rotationally symmetrical, the bristles may be inclined to a small extent in the rotational direction in order to discourage undesired rotation of the bodies. For example, alternate bristles or groups of bristles around the bodies may be inclined in alternate directions in a cross-ply structure to stabilize the bodies against such rotation.

The bristles of each of the bodies are mounted in groups upon a plurality of bristle-carrying members each guided for movement towards and away from the said body. These bristle-carrying members may be spaced apart at intervals over the surface of the body but preferably they combine to cover the whole of the relevant surface of the body and therefore lie closely together at one limit of their guided movement. By way of example, in the case of generally cylindrical bodies having outwardly-directed bristles, the bristle-carrying members may each form one angular segment of the cylindrical surface of the body. Preferably such segments are all of equal angular size, for example 4, 6 or 8 segments each covering, respectively, 90 degrees, 60 degrees or 45 degrees of the cylindrical surface of the body.

The bristle-carrying members are guided so that they may move towards and away from the body upon which they are mounted. Preferably that movement is generally radial with respect to the axis of a generally cylindrical body. To that general end, the axially opposite ends of each bristle-carrying member may be designed to engage generally radial slots or guide channels in the ends of the body. As an alternative, the bristle-carrying members may be mounted upon pins extending through radial apertures or bores in the body, or may themselves slide upon radial pins upon the body.

The movement of the bristle-carrying members towards and/or away from the associated bodies is effected by a fluid pressure means. It is preferred that the latter means be hydraulically, or more preferably pneumatically, operated. By way of example, when the bristle-carrying members each form an angular segment of the body, a membrane, for example a generally cylindrical tubular bag-shaped membrane, may be located along the axis of the body in contact with the radially inner faces of the members. When the membrane is caused to expand outwardly, either by stretching or by unfolding, upon the introduction of, say, compressed air into its interior, the bristle-carrying members are thereby urged outwardly. The latter members may subsequently disengage from the surface being traversed either simply in response to the absence of radially outward pressure or, more positively, under the action of one or more return springs when the fluid pressure is removed.

In one alternative form of the surface-traversing vehicle according to the present invention, the bristle-carrying members are each supported upon a plurality of inwardly-directed pistons, each arranged to slide, in response to fluid pressure on their inner ends, outwardly within radial, fluid-tight bores within the associated body. The return movement of the bristle-carrying members may, for example, be in response to evacuation of the bores and/or by the action of one or more springs and/or by the resilient action of the bristles themselves.

In yet another form of the vehicle of the present invention, in particular for use in restricted spaces such as within narrow-bore pipes, the bristles may be mounted directly upon pistons, that is, the bristle-carrying members are then themselves in the form of pistons. Typically, such bristle-carrying pistons are moved by means of a membrane, preferably a generally tubular membrane such as in the form of a thin-walled bag.

Whatever the form of the fluid pressure means by which the movement of the bristle-carrying members is effected, it is advantageous to provide also a resilient means tending to resist that movement of the bristle-carrying members. In this way, by varying the pressure of the fluid pressure means, the bristle-carrying members may be set in a selected position intermediate to their fully-retracted and their fully-extended positions. This enables the bristles to be inclined to a greater or lesser extent to take account of variations in the surface being traversed by the vehicle. By way of example, if the frictional value of the surface changes in response to variations in the surface roughness or as a result of the presence of a lubricant on the surface, the inclination of the bristles may be modified to maintain the desired level of grip of the body upon the surface. Similarly, when the vehicle is being used to traverse the interior surface of a hollow conduit, for example of a pipe, the amount by which the bristle-carrying bodies are extended may be modified in this way to compensate for variations in the internal cross-sectional dimensions of the conduit.

Such a resilient means to resist the movement of the bristle-carrying members may take various forms, including for example that of one or more springs, e.g. coil springs. In one form, the resilient means comprises one or more pieces of a resilient polymeric material, for example an annular piece surrounding an end of the bristle-carrying bodies or one such piece at each end thereof. The polymeric material may for example be of a resilient polyurethane or a natural or synthetic rubber.

When the surface-traversing vehicle according to the present invention includes bristle-carrying members whose degree of extension can be varied as described above, it is advantageous and preferred to provide one or more sensors to monitor the characteristics of the surface, for example pipe diameter and/or surface roughness, ahead of the vehicle, so that the fluid pressure within each body, and thereby the degree of extension of the bristles, may be modified to take account of any variations in the surface characteristics as the vehicle encounters such variations. The fluid pressure may be modified by the person operating the vehicle or, advantageously, using some form of automatic "intelligent" controller.

The resilient bristles may be of any material having the selected resiliency and may be chosen to reflect the circumstances in which the vehicle is to operate including, among other factors, the load to be supported and/or towed by the vehicle. Thus they may be natural bristles or they may be of a synthetic polymeric material, for example, or of a metal. The selected material preferably has a relatively high stiffness and a good elasticity. It is particularly preferred to use metal bristles, for example of steel, in view of the quick elastic response, and the usually better surface grip, of such metal bristles. Because, by virtue of the present invention, any required reversal of the direction of inclination of the bristles is greatly aided by the retraction of the bristles, bristles of higher stiffness may be used than would be possible if they had to be re-directed without retraction.

The vehicle moves over the surface in response to the movement of the bodies towards and away from each other. This relative movement of the bodies may be achieved by any desired means, for example by electrical power provided by an on-board source such as a rechargeable battery or by a remote source via an electrical line. However it is particularly preferred to effect relative movement of the bodies by fluid pressure, in particular by linking the bodies by a hydraulic or more preferably pneumatic cylinder.

Additional support for the bodies may be provided in the form of one or more wheels, whereby the load borne by the bristles is reduced. Such wheels may be located upon the bodies themselves or upon the links between them, for example.

In one advantageous form of the invention, wheels may be mounted directly upon one or more of the bristle-carrying members. In this way, the distance, or the minimum distance, of the bristle-carrying members from the surface under treatment may be set at an advantageous predetermined value, for example a value at which the inclination of the bristles relative to the surface is optimized.

While the surface-traversing vehicle according to the invention may comprise just two of the bristle-supported bodies, it may prove advantageous to provide three or more such bodies. For example, reversal of the direction of operation of the vehicle may be assisted by the provision of a third body and/or the movement of the vehicle overall may be rendered more smooth in this way. In one arrangement, the bodies may be coupled together in pairs, with the two bodies in each pair being coupled at a fixed distance apart, thereby increasing the effective length of each body.

Particularly when the vehicle comprises at least three of the bristle-supported bodies, it is desirable that the required relative movement of the bodies be effected automatically, for example by means of a suitable controller, which may be located either upon the vehicle or at a remote location, to which latter the vehicle may be linked by a direct line or by radio.

When the vehicle is designed to be operated pneumatically, an air line may be provided from a remote source of compressed air to the pneumatic cylinders. That line may be combined with an electrical line, in the form of an umbilical linking a remote control position to the vehicle. The umbilical may in turn be dragged behind the vehicle by means of a similar towing vehicle specifically provided for that purpose. As the vehicle proper moves further from the control position, supplementary such umbilical tugs may be added. Sensors in the line may monitor tension in the umbilical and in turn prompt an umbilical tug to respond by accelerating or decelerating briefly.

BRIEF DESCRIPTION OF THE SEVERAL VIEWS OF THE DRAWINGS

The invention will now be further described with reference to the accompanying drawings, which illustrate, by way of example only, three alternative preferred forms of the bristle-supported bodies of the surface-traversing vehicle according to the present invention and wherein.

FURTHER DETAILED DESCRIPTION OF THE INVENTION

Figure 1:
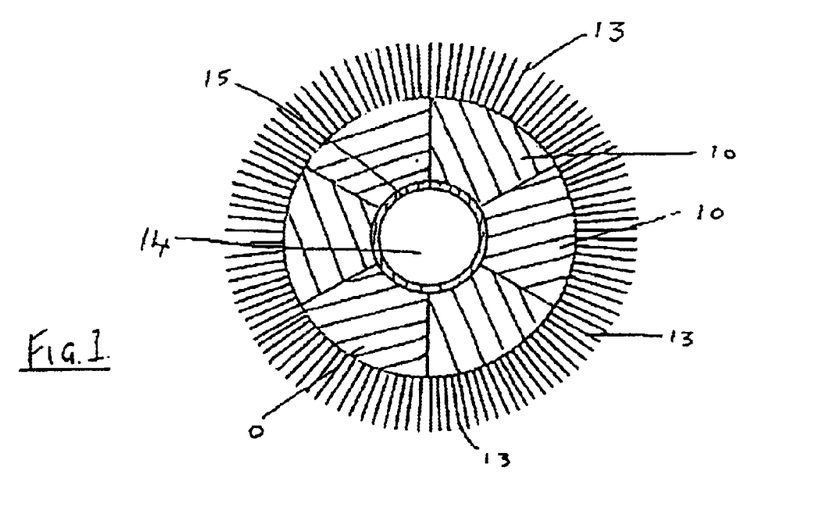
FIG. 1 is a transverse sectional view of a first embodiment of a bristle-supported body, with the bristles retracted.
Figure 2:
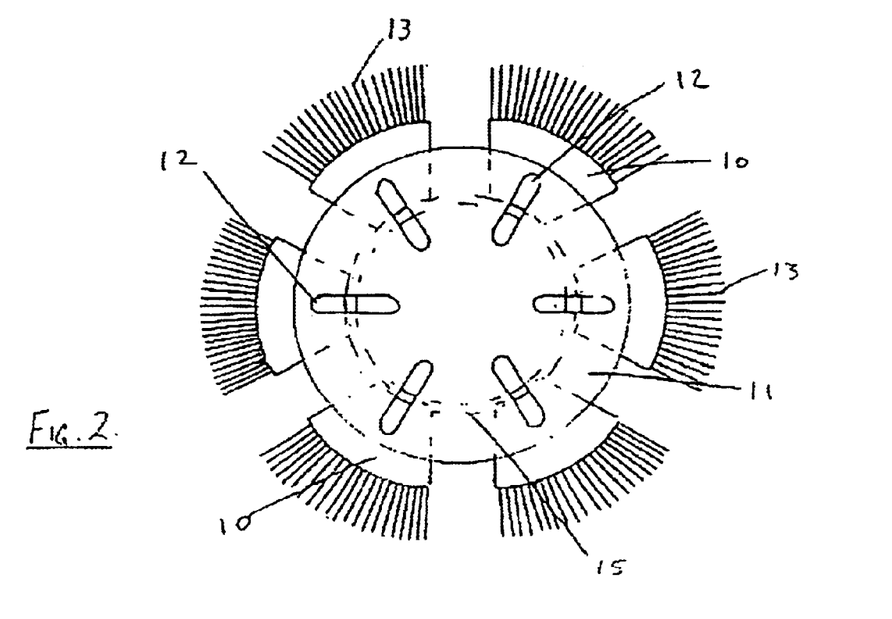
FIG. 2 is an elevation from one end of the body of FIG. 1, with the bristles extended.

The body illustrated in FIGS. 1 and 2 is of cylindrical form and is constructed from six bristle-carrying members 10, each forming one sector of the cross-section of the cylinder. The members 10 are shown as solid but may be of a more open construction in order to limit their weight. The members 10 are mounted together between disc-shaped end-plates 11 and each member engages a guide slot 12 at each of its ends, which guide slots permit the members 10 to move by a limited amount radially outwardly relative to the axis of the body. Each of the members 10 carries a large number of bristles 13 distributed throughout the length of its outer curved surface.

Located within a central bore 14 and extending throughout the length of that bore is a generally cylindrical, tubular bag-shaped membrane 15, made of a stretchable rubber material. The membrane 15 may be expanded by the introduction of air under pressure into the interior of the tubular membrane and, in expanding, it drives the bristle-carrying members 10 outwardly, their movement being constrained to a radial path by the guide slots 12. In one form of the invention, the membrane 15 is encircled by a strong restraining sheath, for example of metal foil (not shown), to prevent the membrane entering the gaps which are formed between the members 10 as they move outwardly.

Thus an increase of air pressure within the membrane 15 causes the bristles to move into engagement with the inner wall of a conduit or the like (not shown) within which the vehicle is located and thereby to grip that wall and allow the vehicle to progress along the conduit in the manner described above. Spring means (not shown) may be provided to assist the inward return of the members 10, and thereby retraction of the bristles 13, on removal of the air pressure within the membrane 15. Retraction of the bristles in this way allows the bristle-supported body to be moved axially to redirect the inclination of the bristles.

Figure 3:
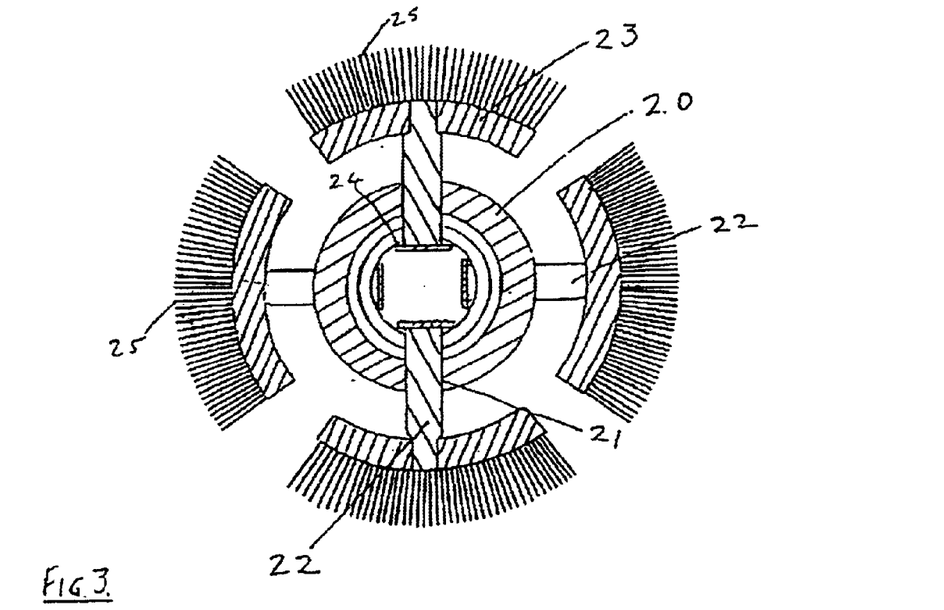
FIG. 3 is a transverse sectional view of a second embodiment of bristle-supported body, with the bristles extended.

The form of the bristle-supported body illustrated in FIG. 3 comprises a tubular aluminium cylinder 20 pierced throughout its length by a number of air-tight bores 21. The bores 21 are distributed in staggered pairs along the length of the cylinder. Within each bore 21, a piston-type pin 22 is slidable. Each of four aligned series of pins 22 supports an elongated bristle-carrying member 23, of arcuate cross-section. The members 23 engage each other to combine to form a cylindrical outer face to the body when they are slid radially inwardly to the maximum extent.

Each pin 22 carries an integral disc-shaped plate 24 at its inner end. The staggering of the bores 21 as illustrated allows the pins 22 to move towards their radially most inward positions without mutual interference.

Because the bores 21 are air tight, an increase of air pressure within the cylinder 20, acting upon the plates 24, causes the pins 21 to move radially outwardly and in turn to move the members 23, and bristles 25 carried by them, to their outermost positions as shown. In this position, the bristles may engage the inside face of a generally tubular conduit. When it is desired to retract the bristles out of engagement with the surface which is being traversed by the vehicle, the pins 22 are withdrawn radially inwardly by a reduction of the air pressure within the cylinder 20. The retraction of the members 23 in this way may, if desired, be aided by springs provided to act upon the pins 22 and/or by the natural resilience of the bristles 25.

Figure 4:
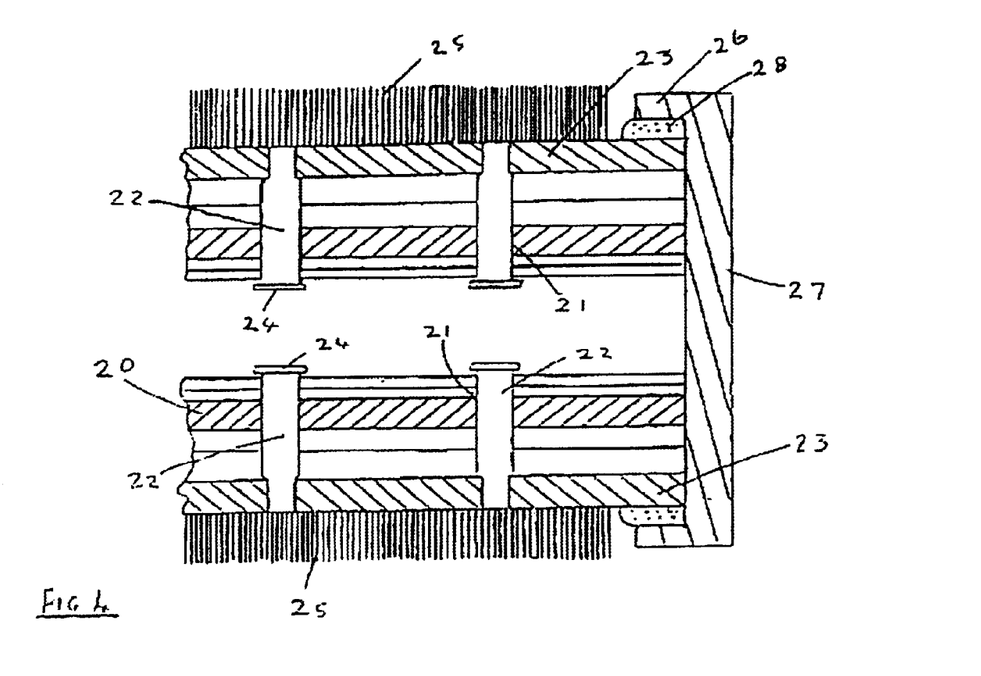
FIG. 4 is a longitudinal sectional view of one end of the embodiment of FIG. 3, with the bristle-carrying bodies extended.

The bristle-supported body of which one end is illustrated in FIG. 4 is closely similar to that of FIG. 3 and like numerals are used to identify like parts. However at each end of the body, a resilient annular "spring" 28 of polyurethane encircles the bristle-carrying members 23 between the outer surface of those members and a flange 26 projecting from the end-plate 27.

The body of FIG. 4 is illustrated in the condition in which the bristles 25 are extended to a maximum extent and in which therefore the spring 28 is fully compressed. However if the air pressure within the cylinder 20 is set at a lower level, then the resilience of the spring 28 urges the members 23 radially inwardly until a balance is reached between the air pressure within the cylinder 20 acting upon the pressure plates 24 and the inwardly-directed pressure of the spring. Thus the degree to which the members 23 and bristles 25 are extended radially outwardly can be set at any time by varying the air pressure in the cylinder 20. In this way, the bristles can be inclined against the inner face of a conduit in which the bristle-supported body is located, to an angle of inclination appropriate to the internal diameter of the conduit and to the frictional characteristics of the inner surfaces of the conduit. That angle of inclination can subsequently be varied readily by increasing or reducing the air pressure to the necessary extent.

Figure 5:
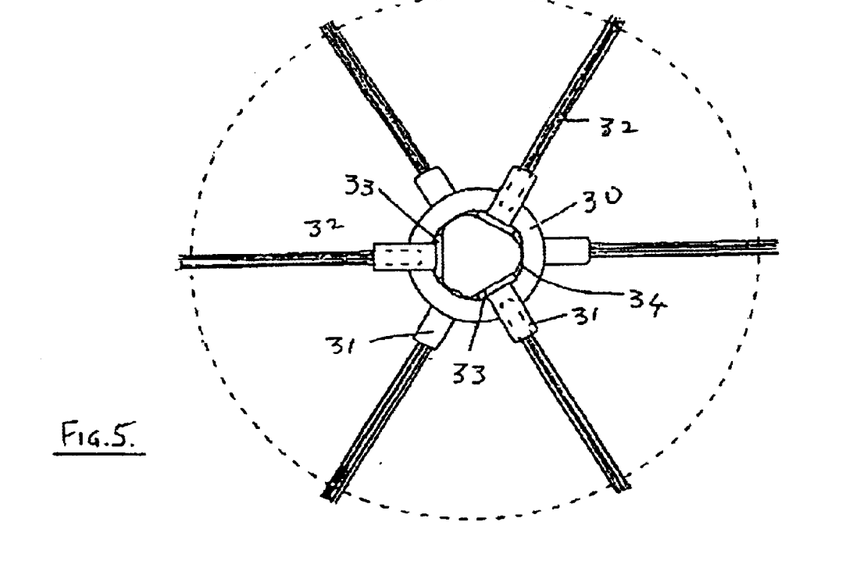
FIG. 5 is a transverse sectional view of a third embodiment of a bristle-supported body, with the bristles extended.
Figure 6:
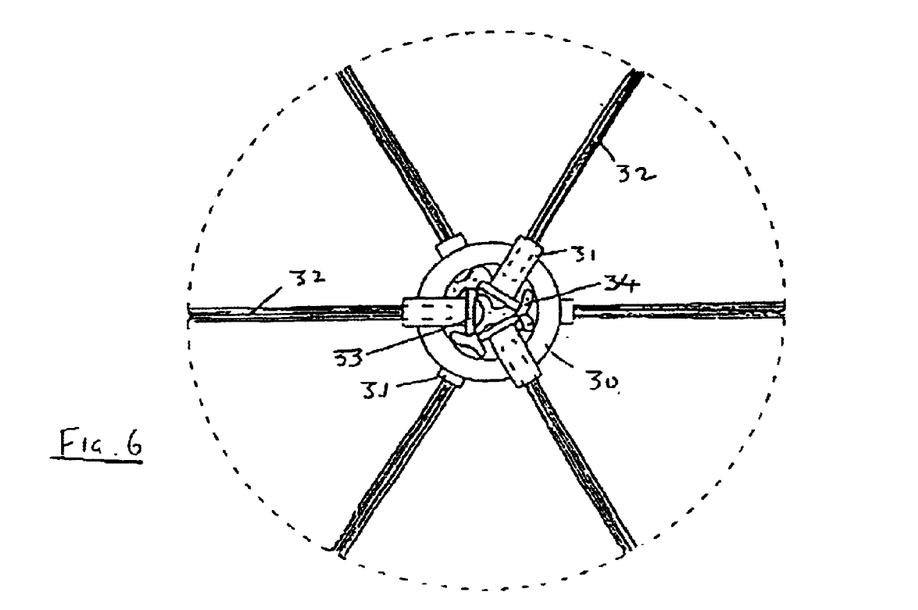
FIG. 6 is a view corresponding to that of FIG. 5, with the bristles retracted.
Figure 7:
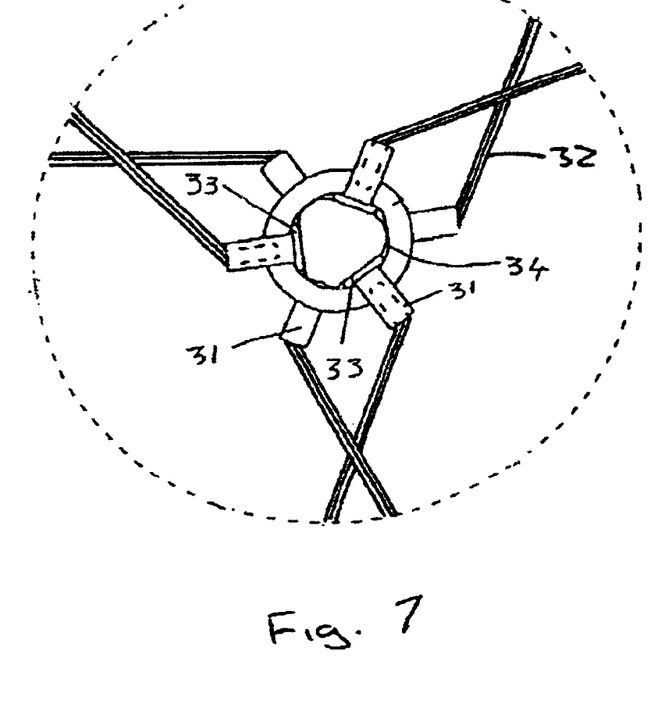
FIG. 7 is a view corresponding to FIG. 5 of a fourth embodiment of a bristle supporting body, with the bristles thereof extended.

Referring now to FIGS. 5 and 6, the bristle-supported body 30 there illustrated is of particular value, but not exclusively, for use in a tubular conduit of a relatively small diameter, for example of the order of 5 to 15 cm. Piston-shaped ferrules 31, each of which supports a number of bristles 32, extend radially through the body 30 and are free to move by a short radial distance relative to the body. In the illustrated form of the invention, the ferrules are mounted in symmetrical groups of three, alternate groups being staggered angularly along the length of the body 30. Referring to FIG. 7, an embodiment of the invention in which the bristles 32 form a cross-ply structure is shown.

The inner ends of the ferrules 31 are in the form of flat plates 33 and, within the body 30 and designed to apply an outward radial force upon the plates 33, is an air bag 34. As shown in FIG. 5, when the air bag 34 is inflated, the bristles are driven outwardly to enable them to engage the inner surface of a cylindrical conduit (not shown) in which the body 30 is disposed.

When the air bag 34 is subsequently evacuated and thereby collapsed inwardly as shown in FIG. 6, the ferrules 31 return inwardly into the body 30 by virtue of the resilience of the bristles 32 and the bristles are thereby retracted, to enable the surface-traversing vehicle to be moved axially, for example to reverse the direction of inclination of the bristles relative to the surface being traversed.

Figure 8:
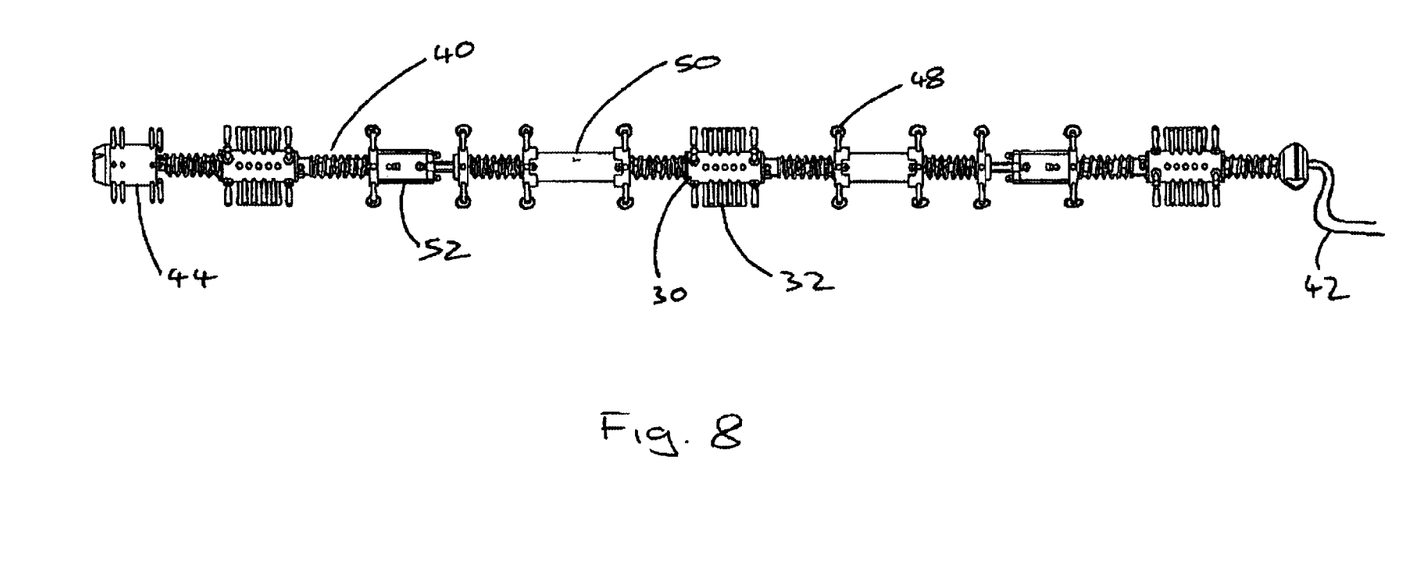
FIG. 8 is a side view of a surface traversing vehicle incorporating features shown in FIGS. 1 to 7.

Finally, referring to FIG. 8, a surface traversing vehicle having three bristle supporting bodies 30, connected by a series of linkages 40 is shown. The vehicle has a power supply umbilical 42 and a front-end sensor 44. The vehicle is supported on a plurality of wheels 48. The vehicle is controlled by a control unit 50 and has a hydraulic cylinder 52 used to inflate and deflate the air bags (not shown).

What is claimed is:

1. A surface-traversing vehicle comprising a plurality of bodies, at least one moving device for moving at least one pair of adjacent said bodies generally axially towards and away from each other, a plurality of bristle-carrying members mounted on each of at least two of said plurality of bodies, a plurality of resilient bristles mounted to each said bristle-carrying member, wherein each said bristle-carrying member is adapted to be moved in a respective first direction that has a radical component away from the body to witch it is mounted and a respective second direction towards the body to witch it is mounted. and at least one fluid pressure device for moving each said bristle carrying member in at least a first direction relative to the body to witch it is mounted, wherein said moving device is adapted to causes said vehicle to traverse a surface by moving at least one pair of adjacent said bodies towards and away from each other when a plurality of said bristles of said body are in engagement with the surface to support the vehicle.

2. A surface-traversing vehicle according to claim 1, wherein a plurality of said bodies are substantially flat or are rotationally symmetrical.

3. A surface-traversing vehicle according to claim 2, wherein alternate bristles or groups of bristles around said bodies are inclined to a small extent in alternate directions in the rotational direction of said bodies.

4. A surface-traversing vehicle according to claim 1, wherein a plurality of said bodies are substantially cylindrical and said bristles extend substantially radially outwardly or inwardly of the corresponding said body.

5. A surface-traversing vehicle according to claim 1, wherein a plurality of said bristle-carrying members combine to substantially cover a surface of at least one said body at one limit of movement of said bristle-carrying member relative to said body.

6. A surface-traversing vehicle according to claim 5, wherein said bristle-carrying members each form one angular segment of the surface of a substantially cylindrical body.

7. A surface-traversing vehicle according to claim 1, wherein the movement of said bristle-carrying members is guided by slots, guide channels, apertures or bores in the corresponding said body or by radial pins upon the corresponding said body.

8. A surface-traversing vehicle according to claim 1, wherein at least one of said at least one fluid pressure device comprises a membrane in contact with the inner faces of the corresponding said bristle-carrying members.

9. A surface-traversing vehicle according to claim 1, wherein at least one of said at least one fluid pressure device comprises a plurality of pistons arranged to slide in fluid-tight bores within the associated body.

10. A surface-traversing vehicle according to claim 9, wherein said bristle-carrying members are themselves in the form of said pistons.

11. A surface-traversing vehicle according to claim 1, further comprising at least one resilient member tending to resist movement of a respective said bristle-carrying member relative to the corresponding said body.

12. A surface-traversing vehicle according to claim 11, wherein said at least one resilient member comprises one or more springs.

13. A surface-traversing vehicle according to claim 1, further comprising one or more sensors to monitor the characteristics of the surface ahead of the vehicle.

14. A surface-traversing vehicle according to claim 1, wherein said resilient bristles are natural bristles or formed of a synthetic polymeric material or of a metal.

15. A surface-traversing vehicle according to claim 14, wherein said resilient bristles are of steel.

16. A surface-traversing vehicle according to claim 1, wherein at least one of said at least one moving device is adapted to use electrical power.

17. A surface-traversing vehicle according to claim 1, wherein at least one of said at least one moving device is adapted to use fluid pressure.

18. A surface-traversing vehicle according to claim 17, wherein a plurality of said bodies are linked by at least one hydraulic or pneumatic cylinder.

19. A surface-traversing vehicle according to claim 1, wherein said bodies are further supported by one or more wheels, located upon said bodies or upon the links between them or upon one or more of the bristle-carrying members.

20. A surface-traversing vehicle according to claim 1, comprising three or more said bodies.

21. A surface-traversing vehicle according to claim 20, wherein the bodies are coupled together in pairs, the two bodies in each pair being at a fixed distance apart.

22. A surface-traversing vehicle according to claim 21, further comprising at least one control device to effect automatically relative movement of the bodies.

23. A surface-traversing vehicle according to claim 21, adapted to be operated from a remote position via an umbilical line towed by a similar towing vehicle.

24. A self-propelled surface-traversing vehicle, comprising at least a first body and a second body, said first and second bodies being operatively-connected and each comprising at least one bristle-carrying member having a plurality of resilient bristles, wherein said vehicle can be propelled along a surface by a generally axial movement of said first and second bodies towards and away from each other when a plurality of said bristles are engaged with the surface, at least said first body further comprising a hydraulic or pneumatic moving mechanism for radially moving at least one of said bristle-carrying members with respect to said first body.

25. The surface-traversing vehicle of claim 24, wherein said second body further comprises a hydraulic or pneumatic moving mechanism for radially moving at least one of said bristle-carrying members with respect to said first body.

26. The surface-traversing vehicle of claim 25, wherein said moving mechanism is pneumatic.

27. The surface-traversing vehicle of claim 24, wherein said moving mechanism is pneumatic.

* * * * *